United States Patent [19]

Reschke et al.

[11] Patent Number: 4,728,491
[45] Date of Patent: Mar. 1, 1988

[54] CLADDING TUBE OF A ZIRCONIUM ALLOY ESPECIALLY FOR A NUCLEAR REACTOR FUEL ROD AND METHOD FOR FABRICATING THE CLADDING TUBE

[75] Inventors: Siegfried Reschke, Duisburg; Eckard Steinberg, Erlangen, both of Fed. Rep. of Germany

[73] Assignees: Kraftwerk Union Aktiengesellschaft, Mülheim; NRG Nuklearrohtgesellschaft mbH, Duisburg, both of Fed. Rep. of Germany

[21] Appl. No.: 761,561

[22] Filed: Aug. 1, 1985

[30] Foreign Application Priority Data

Aug. 6, 1984 [DE] Fed. Rep. of Germany ....... 3428954

[51] Int. Cl.⁴ ............................................. C22F 1/18
[52] U.S. Cl. .............................. 376/457; 148/11.5 F
[58] Field of Search ............... 376/457, 900, 417, 429, 376/414, 416; 148/11.5 F, 12.7 B, 133; 420/422

[56] References Cited

U.S. PATENT DOCUMENTS

| 4,233,834 | 11/1980 | Matinlassi | 72/208 |
| 4,390,497 | 6/1983 | Rosenbaum | 376/417 |
| 4,584,030 | 4/1986 | McDonald | 376/457 |

FOREIGN PATENT DOCUMENTS

| 0085553 | 8/1983 | European Pat. Off. . |
| 2550029 | 6/1976 | Fed. Rep. of Germany . |
| 2951102 | 6/1980 | Fed. Rep. of Germany . |

Primary Examiner—Donald P. Walsh
Attorney, Agent, or Firm—Herbert L. Lerner; Laurence A. Greenberg

[57] ABSTRACT

Cladding tube of a zirconium alloy especially for a nuclear reactor fuel rod, characterized by the feature that the geometric mean of the grain diameters in the zirconium alloy is smaller than or equal to 3 μm.

6 Claims, 2 Drawing Figures

CLADDING TUBE OF A ZIRCONIUM ALLOY ESPECIALLY FOR A NUCLEAR REACTOR FUEL ROD AND METHOD FOR FABRICATING THE CLADDING TUBE

BACKGROUND OF THE INVENTION

1. Field of the Invention

The invention relates to a cladding tube of a zirconium alloy especially for a nuclear reactor fuel rod and method for fabricating the cladding tube.

2. Description of the Prior Art

Such cladding tubes must meet stringent requirements especially with respect to the so-called "stress corrosion". This stress corrosion involves a corrosion mechanism on the inside of the cladding tube in the nuclear reactor, for which expansion of the cladding tube due to swelling of the filled-in nuclear fuel and nuclear fission products liberated by the nuclear fuel such as iodine are responsible. Stress corrosion plays a particular role in nuclear reactor fuel rods which are inserted into boiling-water nuclear reactors. There, particularly abrupt power changes of the nuclear reactor can lead to a breakthrough of the cladding tube walls of the nuclear reactor fuel rod due to stress corrosion.

It is known from German Published Prosecuted Application (DE-AS) No. 25 50 029 to provide cladding tubes of a zirconium alloy for nuclear reactor fuel rods with an inner lining of highest-purity zirconium in order to avoid stress corrosion. This inner lining is obtained by co-extrusion of the cladding tube blank with a tube of highest-purity zirconium which is inserted into the bore of the cladding tube blank and has been welded there to the cladding tube blank. Highest-purity zirconium is a very expensive material. In addition, the tube of high-zirconium must be fitted very accurately into the bore of the cladding tube blank if an acceptable metallurgical joint between the high-purity zirconium and the zirconium alloy of the cladding tube is to take place in the subsequent co-extrusion. A cladding tube of zirconium alloy lined with high-purity zirconium on the inside, can therefore be obtained only by an elaborate and expensive process.

SUMMARY OF THE INVENTION

It is an object of the invention to simplify and make more cost-effective the fabrication of cladding tubes of a zirconium alloy which are resistant to stress corrosion.

With the foregoing and other objects in view, there is provided in accordance with the invention a cladding tube of a zirconium alloy especially for a nuclear reactor fuel rod, characterized by the feature that the geometric mean of the grain diameters in the zirconium alloy is smaller than or equal to 3 $\mu$m.

In accordance with the foregoing, there is provided a method of manufacturing a finished cladding tube of a zirconium alloy from a starting tube, especially for a nuclear reactor fuel rod, in which finished cladding tube the geometric mean of the grain diameters in the zirconium alloy is smaller than or equal to 3 $\mu$m, which comprises, pilger-rolling a starting tube to obtain a cross section change of the tube wall of 90% or more and produce a finished cladding tube without recrystallization anneal and free of cracks.

Other features which are considered as characteristic for the invention are set forth in the appended claims.

Although the invention is illustrated and described herein as embodied in cladding tube of a zirconium alloy especially for a nuclear reactor fuel rod and method for fabricating the cladding tube, it is nevertheless not intended to be limited to the details shown, since various modifications may be made therein without departing from the spirit of the invention and within the scope and range of equivalents of the claims.

BRIEF DESCRIPTION OF THE DRAWINGS

The construction and method of operation of the invention, however, together with additional objects and advantages thereof will be best understood from the following description when read in connection with the accompanying drawing, in which.

DESCRIPTION OF THE PREFERRED EMBODIMENTS

Figure 1:
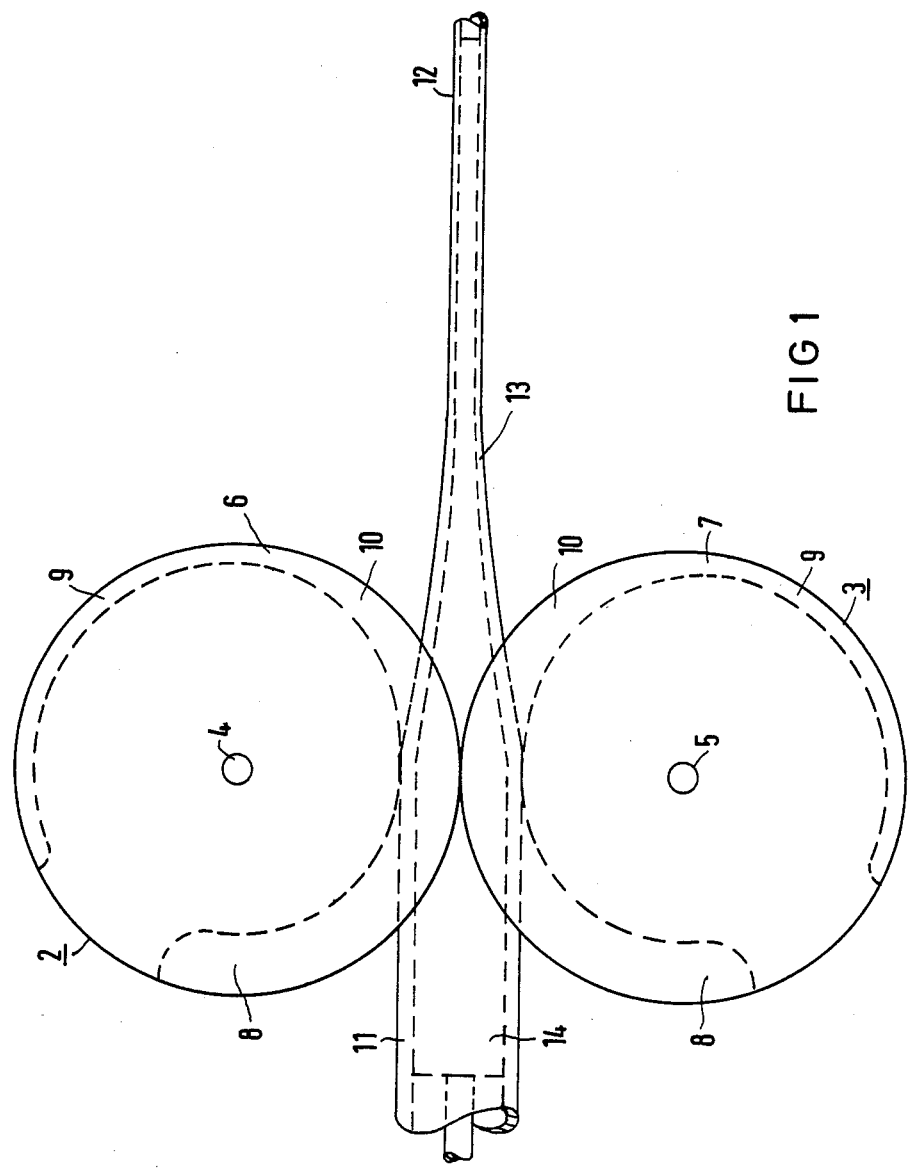
FIG. 1 shows in a schematic side view, both pilger jaws of a pilger rolling machine with a tube of zirconium alloy being processed.

According to the invention, a cladding tube of the type mentioned at the outset is characterized for solving this problem, by the feature that the geometric mean value of the grain diameter in the zirconium alloy is smaller than or equal to 3 $\mu$m.

If the cladding tube of a nuclear reactor fuel rod in a nuclear reactor expands due to swelling of the nuclear fuel, it has been found that due to the fine grain a multiplicity of micro-cracks are generated in the zirconium alloy of the cladding tube with a particularly large total surface, at which the chemically active nuclear fission products liberated from the nuclear fuel are absorbed and are converted into inactive chemical compounds. Deep individual cracks, at which stress corrosion could occur, i.e. could corrode the cladding tube all the way through, are prevented by the fine grain of the zirconium alloy of the cladding tube according to the invention.

Advantageously, the geometric mean value of the grain diameters is in the range of 2.5 $\mu$m to 2 $\mu\mu$m.

In the manufacture of a cladding tube according to the invention, a starting tube is pilger-rolled advantageously to a finished cladding tube without recrystallization anneal and free of cracks that a cross-section change of the tube wall of 90% or more is obtained. This cold-working with a high degree of deformation corresponds largely to the natural deformation by free stretching of the starting tube and leads to the desired fine grain of the zirconium alloy.

It is of advantage to pilger-roll the starting tube to obtain a cross section change of the tube wall in the range of 90 to 98%.

It is advantageous if the starting tube is pilger-rolled in steps and is stress-annealed between two pilger-passes. The stress anneal takes place at an annealing temperature which, while it is high enough so that internal mechanical stresses in the zirconium alloy can be broken down, the temperature is kept below the annealing temperature of the recrystallization anneal, in which a coarsening of the grain in the zirconium alloy comes about. The preferred annealing temperature for stress annealing is in the range of 400° to 500° C. and is maintained for 1 to 5 hours.

The grain diameter in the zirconium alloy can be determined according to ASTM (American Society for Testing Materials), designation E 112-61. The geometric means value is defined as $(d_1.D_2...d_i...d_n)^{1/n}$ with $d_1$ = grain diameter of the $i^{th}$ grain. A pilger-rolling machine is described in U.S. Pat. No. 4,233,834.

The invention and its advantages will be explained in greater detail with the aid of the drawing.

A starting tube consists of a zirconium alloy designated Zircaloy 2 which contains 1.2 to 1.7 percent by weight tin, 0.07 to 0.2 percent by weight iron, 0.05 to 0.15 percent by weight chromium, 0.03 to 0.08 percent by weight nickel, 0.07 to 0.15 percent by weight oxygen and the remaining zirconium. This starting tube has an outside diameter of 63.5 mm and a wall thickness of 11 mm. The geometric mean of the grain diameters in this zirconium alloy is 20 μm. This starting tube is pilger-rolled free of cracks in a pilger rolling machine in a first pilger rolling pass into an intermediate tube with an outside diameter of 30 mm and a wall thickness of 5.5 mm. This intermediate tube is thereupon stress-annealed for 2½ hours at 480° C. Thereupon, this intermediate tube is pilger-rolled again in the pilger-rolling machine in a second pilger-rolled pass in the pilger rolling machine without cracks to form a new intermediate tube with an outside diameter of 18.8 mm and a wall thickness of 2.5 mm. This new intermediate tube is stress-annealed again for 2½ hours at a temperature of 480° C. After cooling off, the new intermediate tube is finally rolled in the pilger rolling machine in a third pilger rolling pass to form the finished cladding tube with an outside diameter of 12.5 mm and a wall thickness of 0.85 mm without cracks. The geometric mean of the grain diameter in the zirconium alloy of this finished cladding tube is 2 to 3 μm.

FIG. 1 illustrates a pilger-rolling stroke carried out by the pilger-rolling machine. The situation approximately at the start of this pilger-rolling stroke is shown. Two pilger jaws 2 and 3 are arranged on top of each other at a rolling mill stand, not shown. Each pilger jaw consists of a cylindrical steel disc. Both pilger jaws 2 and 3 have the same geometric dimensions and each of these two pilger jaws 2 and 3 is mounted on respective shafts 4 and 5 arranged at right angles to the drawing plane of FIG. 1. Cylinder surfaces of both pilger jaws 2 and 3 have respective engravings 6 and 7 of identical design which include an entry caliper 8, a fine caliper 9 and between these two calipers, a working caliper 10 tapered from the entry caliper 8 to the fine caliper 9. Both pilger jaws 2 and 3 touch each other with their cylinder surfaces with the points of the two engravings 6 and 7 with the same caliper always located at the engagement line of the two pilger jaws 2 and 3 during the revolution about the axes of rotation 4 and 5.

The tube of zirconium alloy is arranged at right angles to the plane determined by the axes 4 and 5. To the left of the pilger jaws 2 and 3, there is in FIG. 1 the original tube 11, and to the right, the pilger-rolled tube 12. The original tube 11 changes via a so-called pilger flare 13 into the pilger-rolled tube 12. Inside the tube there is a mandrel 14 which is adapted with its diameter at one end to the original tube 11, at the other end to the pilger-rolled tube 12, and between these two ends, to the desired inside diameter of the pilger flare 13 which is conically tapered over the length of the pilger flare 13.

At the beginning of a pilger stroke, the original tube 11 is located in the two entry calipers 8 of the engravings 6 and 7 of the two pilger jaws 2 and 3. The original tube 11 protrudes through the plane defined by the axes 4 and 5, in which plane the engagement line of the cylinder surfaces of the two pilger jaws 2 and 3 also lies, by about 3 mm to one side of the pilger-rolled tube 12. Furthermore, the end of the entry caliper 8 of the two engravings 6 and 7 at the working caliper 10 at the engagement line of the cylinder surfaces of the two pilger jaws 2 and 3 is at the beginning of this pilger rolling stroke.

These pilger jaws 2 and 3 are moved from left to right in the rolling mill stand, not shown, with cylinder surfaces which are pressed against each other and are in engagement for carrying out the pilger stroke in FIG. 1 such that the longitudinal axes lined up with each other, of the original tube 11, the pilger flare 13 and the pilger-rolled tube 12 are always at right angles to the plane defined by the axes 4 and 5. The motion of the pilger jaws 2 and 3 to the right in FIG. 1 is terminated if the finished tube 12 is located between the pilger jaws 2 and 3 in the fine caliper 9 of the engravings 6 and 7. The length of the mandrel 14 is at least the length of this stroke motion.

At the end of this pilger stroke, both pilger jaws 2 and 3 are lifted off each other in the rolling mill stand, not shown, and are moved back to their starting position toward the left in FIG. 1. In the meantime, the original tube 11 is given a feed of about 3 mm in the direction of its longitudinal axis toward the right in FIG. 1 and a rotation about this longitudinal axis by about 45°. Thereupon, the pilger jaws 2 and 3 are brought into engagement again in the rolling mill stand, not shown, with their cylinder surfaces in such a manner that the end of the entry caliper 8 of the two engravings 6 and 7 is located toward the working cylinder 10 at the engagement line of the cylinder surfaces. Thereupon, a further pilger stroke is carried out as described above.

Figure 2:
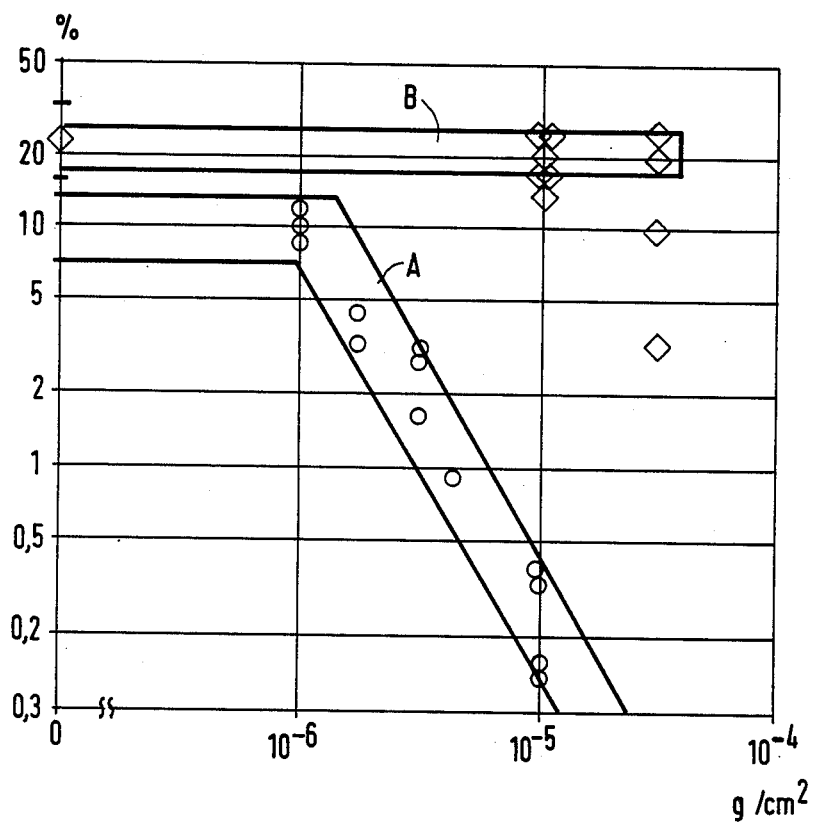
FIG. 2 shows graphically test results on cladding tubes according to the invention and on reference cladding tubes.

In the graphic presentation according to FIG. 2, the radial elongation in percent of cladding tubes which are sealed off at both ends gas tight and are filled with helium and iodine is plotted versus the iodine concentration in grams per $cm^2$ cladding tube inside surface. All cladding tubes have the same length, an outside diameter of 12.5 mm and a wall thickness of 0.85 mm. Also, all cladding tubes consist of Zircaloy 2. The sealed cladding tubes were heated up and they expanded due to their helium filling. The circular measurement points shown in the graphic presentation indicate at what elongation cladding tubes with a mean geometric grain diameter of 8 to 10 μm in the zirconium alloy broke due to corrosion as a function of the iodine concentration in the cladding tube. The square measurement points, on the other hand, indicate the elongation as a function of the iodine concentration at which cladding tubes according to the invention with a geometric mean of the grain diameters in the zirconium alloy of 2 to 3 μm broke due to iodine corrosion. Since iodine is the nuclear fission product which primarily causes stress corrosion of the cladding tubes of fuel rods, the values entered in the graphic presentation according to FIG. 2 give good information regarding the resistance to stress corrosion of cladding tubes of a zirconium alloy according to the invention.

The bent beam A shown in the graphic presentation according to FIG. 2, in which all circular measurement points are located, indicates that the readiness for stress corrosion of cladding tubes with a geometric mean of the grain diameters in the zirconium alloy of 8 to 10 μm increases very considerably with increasing iodine concentration. The cladding tubes according to the invention with a geometric mean in the range of 2 to 3 μm, according to the square measurement points show a comparable readiness for stress corrosion only at very much higher iodine concentrations.

The transverse beam B in the graphic presentation according to FIG. 2 corresponds at an elongation of about 20% to the behavior of cladding tubes which, in known manner, have an inside lining of highest-purity zirconium with a thickness of 0.1 mm. The highest-purity zirconium contains impurities of at most 4,000 ppm and has, in particular, an oxygen content of less than 700 ppm, an iron content of less than 550 ppm, a chromium content of less than 200 ppm and a carbon content less than 120 ppm. The square measurement points for cladding tubes according to the invention show that the latter have the same high resistance to stress corrosion as the cladding tubes with the inner lining of highest-purity zirconium up to relatively high iodine concentrations.

The foregoing is a description corresponding, in substance, to German application No. P 34 28 943.2, dated Aug. 6, 1984, International priority of which is being claimed for the instant application, and which is hereby made part of this application. Any material discrepancies between the foregoing specification and the specification of the aforementioned corresponding German application are to be resolved in favor of the latter.

There is claimed:

1. A nuclear reactor fuel rod having a cladding tube formed solely of a zirconium alloy, characterized by the feature that the geometric mean of the grain diameters in the zirconium alloy is smaller than or equal to 3 μm to minimize deep cracks in the cladding tube caused by chemically active nuclear fission products liberated from nuclear fuel in the cladding tube.

2. A nuclear reactor fuel rod having a cladding tube formed solely of a zirconium alloy according to claim 1, wherein the geometric mean of the grain diameters is in the range of 2 to 2.5 μm.

3. Method of manufacturing a finished cladding tube formed solely of a zirconium from a starting tube of a zirconium alloy in which the geometric mean of the grain diameters in the zirconium alloy is greater than 3 μm, for a nuclear reactor fuel rod, in which finished cladding tube the geometric mean of the grain diameters in the zirconium alloy is smaller than or equal to 3 μm, which comprises, pilger-rolling a starting tube consisting essentially of a zirconium alloy in a plurality of pilger-rolling steps sufficient to obtain a cross section change of the tube wall of 90% or more and to reduce the geometric mean of the grain diameters in the zirconium alloy to smaller than or equal to 3 μm and produce a finished cladding tube without recrystallization anneal and free of cracks.

4. Method according to claim 3, wherein the cross section change of the tube wall in the range of 90 to 98% is obtained.

5. Method according to claim 3, wherein the starting tube is stress-annealed between two pilger steps.

6. Method according to claim 5, wherein the annealing temperature for stress annealing is in the range of 400° to 500° C. and is maintained for 1 to 5 hours.

* * * * *